United States Patent Office 2,871,647
Patented Feb. 3, 1959

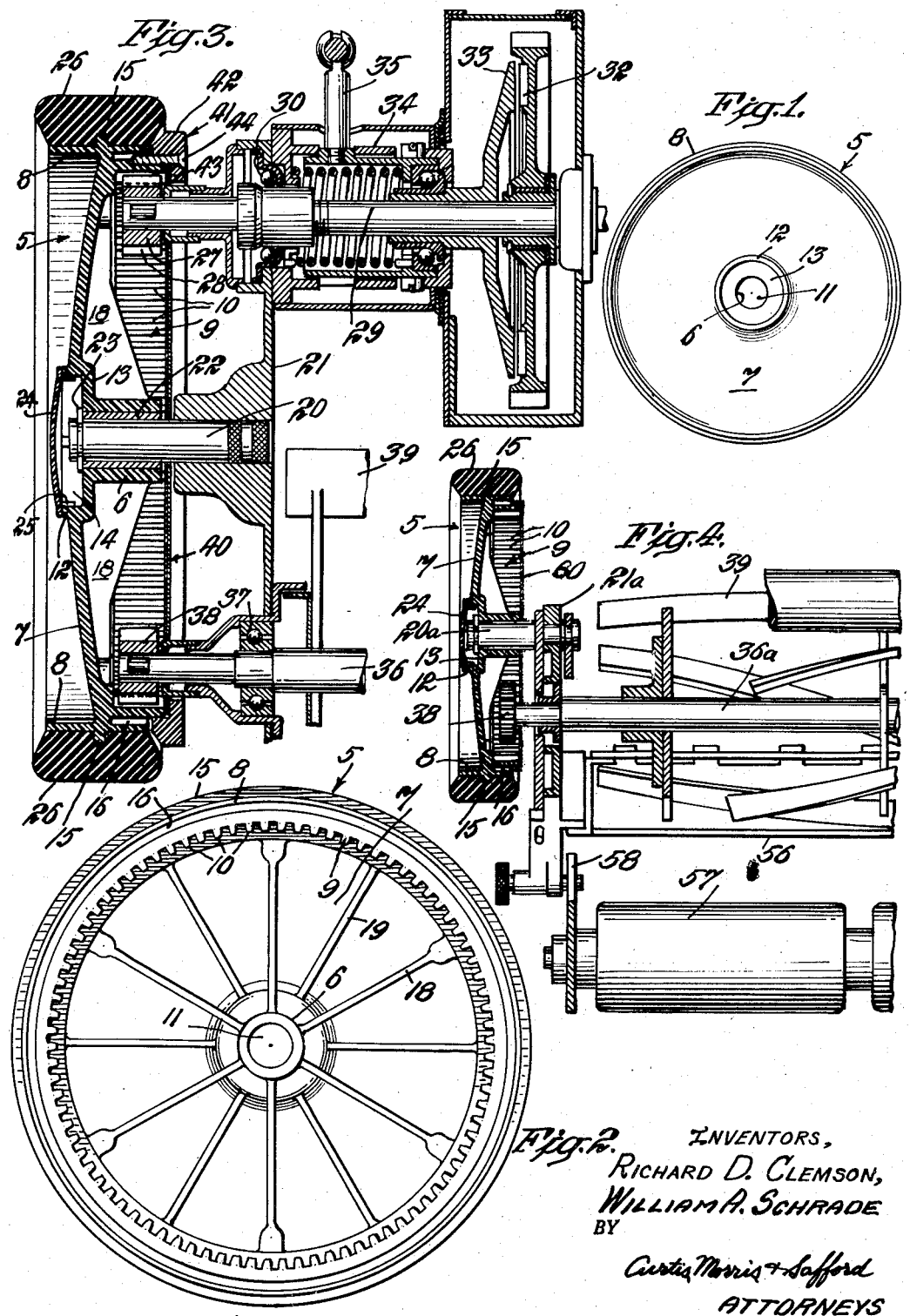

2,871,647

LAWN MOWER WHEEL

William A. Schrade, Clemson Park, and Richard D. Clemson, Middletown, N. Y., assignors to Clemson Bros., Inc., Middletown, N. Y.

Application June 6, 1956, Serial No. 589,629

3 Claims. (Cl. 56—249)

The present invention relates to lawn mowers and more particularly to an improved drive wheel adapted for use in a lawn mower.

Heretofore, it has been considered necessary to make lawn mower drive wheels of metal to give them the required strength. Such metal wheels are either cast from iron or other metals or alloys or pressed from sheet steel. Metal wheels are quite heavy and must be subsequently finished by separate machining or assembling operations, and usually require a coat of paint to protect them from corrosion. The wheels have intermeshing ring and pinion gears, usually of steel, which produce considerable noise during operation. The metal ring and pinion gears require lubrication, and sometimes the wheels are packed with a heavy grease to reduce frictional resistance and noise as much as possible. Furthermore, metal gears when made strong enough to prevent breaking are unyielding and shock resulting from a stone or the like being caught between the rotating and stationary blades is apt to cause a permanent deformation of a blade.

One of the objects of the present invention is to provide lawn mower wheels that have the strength and durability required and avoid objectionable features of pressed and cast metal wheels.

Another object is to provide a wheel of the type indicated having its ring gear and teeth thereof molded as an integral part of the wheel with smooth accurately finished surfaces.

Another object is to make a lawn mower drive wheel adapted to absorb shock without breaking or permanently deforming the ring gear, its teeth or the cutting blades.

Still another object of the present invention is to provide a lightweight wheel of the type indicated, having a pleasing appearance, requiring no lubrication, quiet in operation, and adapted for economical manufacture.

In this specification and accompanying drawings, we have shown and described a preferred embodiment of our improved lawn mower wheel applied to different types of lawn mowers, but it is to be understood that the illustrated embodiments are not intended to be exhaustive nor limiting of the invention. On the contrary, the description and drawings are for the purpose of disclosing the invention to others skilled in the art so that they may fully understand the principles thereof and the manner of applying it in practical use so that they may modify and adapt it in various forms, each as may be best suited to the conditions of a particular use.

In the drawings:

Figure 1 is a side elevational view of the exterior of a lawn mower drive wheel incorporating the novel features of the present invention;

Figure 2 is an enlarged elevational view of the opposite side of the wheel showing the integral ring gear;

Figure 3 is an elevational view, with parts broken away and shown in section and with proportions somewhat distorted, of a portion of a lawn mower wheel and power drive therefor and showing the contour of the wheel in end elevation; and Figure 4 is an elevational view, with parts broken away and shown in section, of a manually propelled lawn mower and showing the wheel of the present invention mounted thereon.

In accordance with the present invention, the lawn mower wheel and ring gear are composed of a tough, rigid resin of the synthetic rubber type, i. e. a composition of styrene or acrylonitrile or the like in proportions and degree of polymerization which make the product substantially rigid for practical purposes although bordering on the elastomeric condition so that it has good resiliency in yielding to shock while normally withstanding full load with little deformation. Such materials available commercially, can be injection molded to final form and finish. One such material is sold by the Naugatuck Chemical division of the U. S. Rubber Co. under the trade name "Kralastic B." Such a plastic compound has properties superficially similar to hard rubber, but unlike hard rubber being abrasion-resistant, tough and strong, not brittle, without tendency to deform or warp and having much greater capacity for elastic yield while substantially retaining its rigid form. Thus, a one-piece drive wheel, including the internal ring gear teeth, is made in substantially finished form by injection molding. Surprisingly, such a molded plastic wheel is so strong and durable that it withstands the continual bumping and pounding inherent in the operation of a lawn mower and the excessive shocks which result when the blades are blocked by a stone or a nail, etc. Nevertheless, the teeth of the ring gear, formed as an integral part of the wheel, have sufficient strength to transmit the power required under all conditions of operation and sufficient elasticity to absorb shocks without shearing, breaking or eroding from wear. The resulting wheel is of light weight, requires no subsequent machining, has a smooth, finished surface of pleasing appearance in any desired color, is of low friction without lubrication and is quiet in operation.

The ring gear may be used with a driving or driven pinion of steel or nylon. A plastic ring gear and nylon pinion combination is especially advantageous as it produces a low friction, a high resistance to wear and is quiet in operation. One important advantage of the drive gear of my invention is that by cushioning the shocks and hammering, such strong materials wear longer and weaker materials, e. g. die castings, are made feasible.

Referring to the drawings, the wheel 5 comprises a hub 6, a disc portion 7 extending radially and axially of the hub, a rim 8 at the outer periphery of the disc, and a ring gear 9 having integral teeth 10 projecting laterally from the disc in radial spaced relation to the rim. The hub 6 is in the form of an annular, cylindrical sleeve having an axial hole 11 to form an axle box. Hub 6 has an offset, annular flange 12 adjacent one end and connected thereto by a radial wall 13 to provide a recess 14 in the outer surface of the wheel co-axial with the hole 11. The disc portion 7 of the wheel is of concavo-convex form and projects radially from the offset flange 12 and axially toward the opposite end of the hub 6, so that its outer periphery is located in a plane normal to the axle of the hub and intermediate its ends. The rim 8 projects laterally from opposite sides of the disc 7 at its outer periphery to overlie the hub 6 and the rim has a centrally located rib 15 projecting radially therefrom. The internal ring gear 9 projects laterally from the side of the disc 7 adjacent its outer periphery and is spaced radially from the rim 8 to provide an annular slot or recess 16 therebetween. Teeth 10 project axially from the disc 7 at one end and inward radially from the gear ring and, of course, form an integral part of the gear ring and disc. Strengthening ribs 18 project radially from the hub in angularly spaced relationship at the inner side of the wheel. Ribs 18 extend a substantial distance along the hub 6 with their outer edge inclined toward the concaved side of the disc 7 and then radially to the base of the ring gear 9 to provide a clearance for the pinion later to be described. Similar radial ribs 19 are positioned in angularly spaced relation between the ribs 18 and project radially from the annular flange 12 to the base of the ring gear 9 and axially from the concave side of the disc 7. As stated above, the entire wheel is made by a single injection molding operation to form the hub 6, disc 7, rim 8, ring gear 9 including the teeth 10, and strengthening ribs 18 and 19 in a one-piece integral structure.

The wheel of the present invention is adapted to be used on any geared type of lawn mower. As illustrated in Figure 3, the wheel of the present invention is mounted on a fixed axle 20 projecting laterally from the frame 21 of a power-driven lawn mower. Suffice it to state herein that axle 20 is in the form of a polished steel stud having one end anchored in the frame. The plastic hub 6 of the wheel may directly contact the metal axle, but, preferably, a nylon bushing 22 is provided in the wheel which rotates on the polished steel axle 20. It has been found that steel and plastic make an acceptable bearing combination, but nylon and steel are superior and produce less wear. Ball bearings are used on the larger power mowers.

Wheel 5 is held on the axle 20 by retaining means here illustrated as a spring clip 23 engaging an annular recess in the axle and outside face of the wheel. It will be noted that the outer end of the axle 20 and retaining means 23 are located in the annular recess 14 so as not to protrude beyond the flange 12.

A plastic cover plate 24 is detachably mounted on the flange 12 by means of spring fingers 25 to cover the recess 14 and provides a pleasing continuous surface at the exterior of the wheel. A soft resilient tire 26 of rubber or the like is mounted on the rim 8 and retained in position thereon by the rib 15.

The wheel 5 of the power mower is driven by a pinion 27 having teeth 28 meshing with the teeth 10 on the internal ring gear 9. As stated above, pinion 27 may be composed of nylon and is driven by the power shaft 29 through an over-running clutch to accommodate the differential rotation of opposite wheels. With power mowers of larger size, it may be necessary to reinforce the nylon with a metal insert, but provided with a nylon bearing surface for the shuttle of the overrunning clutch, or a steel pinion may be used. Shaft 29, in turn, is mounted for rotation in anti-friction thrust bearings 30 in the frame 21.

Shaft 29 is driven from a gear 32 rotatable on the shaft and connected thereto through a clutch 33. Engagement of the clutch member 33 with the driving gear 32 is controlled by a rotary cam mechanism 34 operated by a radial arm 35, as described more in detail in our prior application, referred to above. Thus, the wheel is positively driven from the driving gear 32 through the clutch 33, shaft 29, pinion 27 and ring gear 9 to rotate the wheel on the axle 20 and thereby propel the mowing machine.

A reel 36 mounted in bearings 37 on the frame 21 has a pinion 38 connected thereto through an over-running clutch which meshes with the internal ring gear 9. The reel 36 has fly knives 39 cooperating with a bed knife (not shown) to constitute a rotary shear as is usual in such mowers. A dust cover 40 is positioned on shaft 20 at the inner side of the wheel. Dust cover 40 comprises a pair of metal discs with each having a hole to accommodate one shaft 29 and 36, respectively, and another elongated slot to accommodate the other shaft to permit adjustment of the cutting unit. The periphery of this cover is embraced by a ring 41 attached to the wheel for rotation therewith.

Ring 41, in addition to providing a dust seal by an overlap fit with the dust cover, also gives rigidity to the outer free edge of the ring gear 9 permitting a thinner section and a saving in the amount of plastic used. The ring 41 has a flange portion 42 overlying the outer periphery of the ring gear 9 with a close fit and a flange portion 43 closely overlying the side of the dust cover 40 adjacent its outer edge. The ring 41 may be made of metal or any strong rigid material, but advantageously is composed of the same plastic material as the wheel. As illustrated, the ring is fastened to the ring gear 9 by self-threading screws 44 which bite into the material of the wheel; but these serve only to hold it in place, the forces which it resists are transmitted directly by its peripheral engagement with the gear 9.

During operation of the mower the reinforcing ring 41 adds rigidity to the outer free edge of ring gear 9 to prevent distortion of the ring gear which would permit the teeth of the pinions 27 or 38 to slip over the teeth of the ring gear, while the teeth 10 will still yield to absorb shock.

The resilient plastic, which yields in the gear teeth enough to protect the cutting edges and mechanism against shock, is made rigid in the wheel disc by the radial ribs 18 and 19, but that leaves the opposite side of the ring gear too flexible. The ring 41 corrects this and supplies the rigidity which makes use of the resilient plastic wholly effective and satisfactory.

Figure 4 illustrates the wheel 5 mounted on the axle 20a of a manually propelled lawn mower. The axle 20a projects laterally from a side frame 21a which also mounts a reel 36a. A pinion 38 on the end of the reel shaft meshes with the internal ring gear 9 of the wheel 5. Helical cutting blades 39 of the reel engage a stationary bed knife 56 to shear the grass. A ground roller 57 is rotatably mounted at the rear of the frame in parts 58 which are adjustable to regulate the height of the bed knife above the bottom of the roller.

When the lawn mower, illustrated in Fig. 4, is manually propelled, the rotation of the wheel 5 relative to the pinion 38, drives the shaft 36a and the reel thereon. It has been found that a nylon pinion 38 operates satisfactorily with a hand driven mower under all conditions of operation and together with the plastic teeth 10 of the internal ring gear 9 provide sufficient elasticity to absorb the shock resulting from a sudden stopping of the reel, without shearing, breaking or deforming teeth on the ring gear or pinion and without permanently deforming the cutting blades. The wheel is provided with a dust cover 60 having a flange 61 projecting into the annular recess 16 in the wheel to make it seal. With the hand mower a reinforcing ring is not necessary.

It has been found that plastic wheels made in accordance with the present invention are sufficiently strong and durable to withstand the strains and shocks of mowing operations. This is due in part to the use of the particular type of elastomer and in part to the form of the wheel. The elastomer provide resiliency and toughness with such rigidity and strength as to provide the durability as above described when used on a lawn mower wheel. The integral, molded teeth of the ring gear have such toughness and resiliency as to transmit power and absorb shock without shearing or breaking. The concavo-convex shape of the web provides for limited flexing in the wheel to accommodate shocks. The rim also may flex without transmitting its distortion to the ring gear, due to the annular space therebetween. The molded plastic wheel without machining has the precise form and the same polished finish as the mold in which it is formed so that bearing faces in the hub and on the gear teeth are substantially perfect when removed from the mold. Pigments of any desired color may be used in the plastic, which together with its polished surface, provides a wheel of pleasing appearance. As the plastic wheel is not subject to corrosion, there is no need of coating the wheel with paint or the like. The accurate dimensions and the character of the smooth molded surfaces of the ring gear teeth, especially when used with the molded nylon pinion, reduce friction to a minimum and thereby the power required to propel the mower. Because of the inherent qualities of these plastics, no lubrication is required between them. The smooth, accurately contoured surfaces of the gear teeth and the nature of the plastics used, substantially eliminates noise produced by the gears during operation.

While a single embodiment of a lawn mower drive wheel is herein illustrated and described and is shown applied to two different types of lawn mowers, it is to be understood that changes may be made in the construction and arrangement of the parts of the wheel without departing from the spirit or scope of the invention.

What is claimed is:

1. An integral one-piece lawn mower drive wheel comprising a hub, a disk, a rim at the outer periphery of the disk, an internal ring gear projecting laterally from one side of said disk in radially spaced relation to the rim and extending beyond the rim at one side, said ring gear having teeth at its inner periphery, and the entire wheel, including said internal ring gear and teeth, consisting of a homogeneous mass of a tough, rigid resilient plastic.

2. A one-piece lawn mower drive wheel in accordance with claim 1 in which a reinforcing ring is attached to the outer edge of the ring gear extending beyond the rim.

3. A one-piece lawn mower drive wheel in accordance with claim 2 in which the reinforcing ring surrounds the portion of the ring gear projecting beyond the rim, fasteners extending through the reinforcing ring and into the space between the rim and ring gear, and a dust cover located between the reinforcing ring and end of the ring gear.

References Cited in the file of this patent

UNITED STATES PATENTS

| | | |
|---|---|---|
| 820,789 | Hutchins | May 15, 1906 |
| 1,499,809 | Duke | July 1, 1924 |
| 1,653,331 | Atwood | Dec. 20, 1927 |
| 2,199,144 | Tegarty | Apr. 30, 1940 |
| 2,338,735 | Person | Jan. 11, 1944 |
| 2,432,621 | Grobowski | Dec. 16, 1947 |
| 2,509,949 | Worthington | May 30, 1950 |
| 2,513,309 | Grobowski | July 4, 1950 |
| 2,513,310 | Grobowski | July 4, 1950 |
| 2,669,485 | Newman et al. | Feb. 16, 1954 |
| 2,764,034 | Hotine | Sept. 25, 1956 |